A. L. HATFIELD.
REINFORCED VULCANIZABLE ARTICLE AND METHOD OF PRODUCING THE SAME.
APPLICATION FILED FEB. 5, 1916.
1,205,345.
Patented Nov. 21, 1916.
2 SHEETS—SHEET 1.
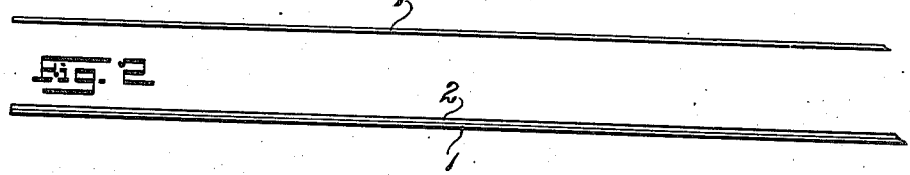
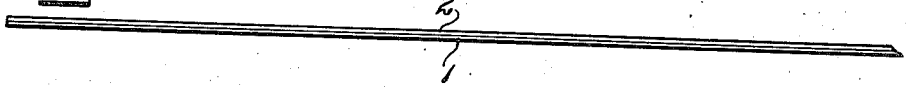
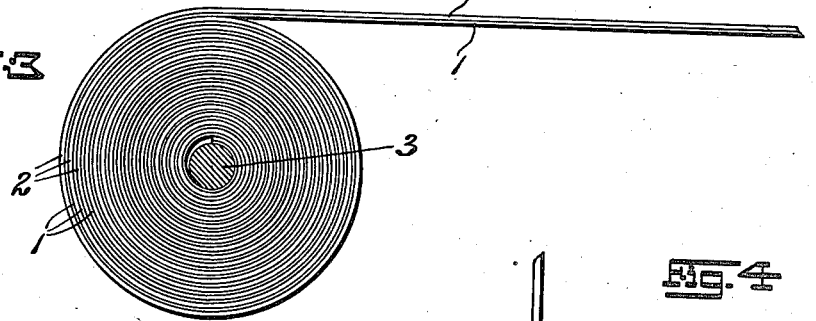
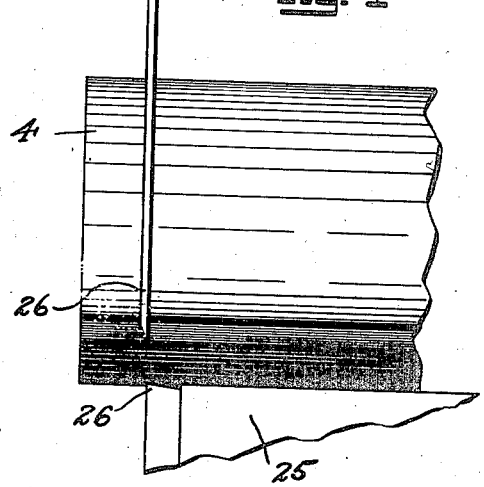
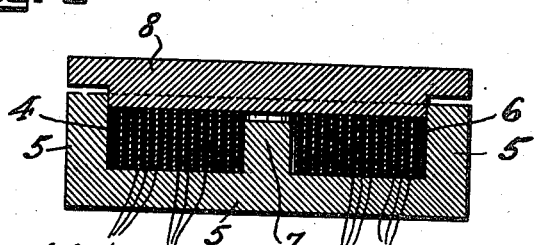
WITNESSES:
INVENTOR
Andrew L. Hatfield,
BY
ATTORNEYS

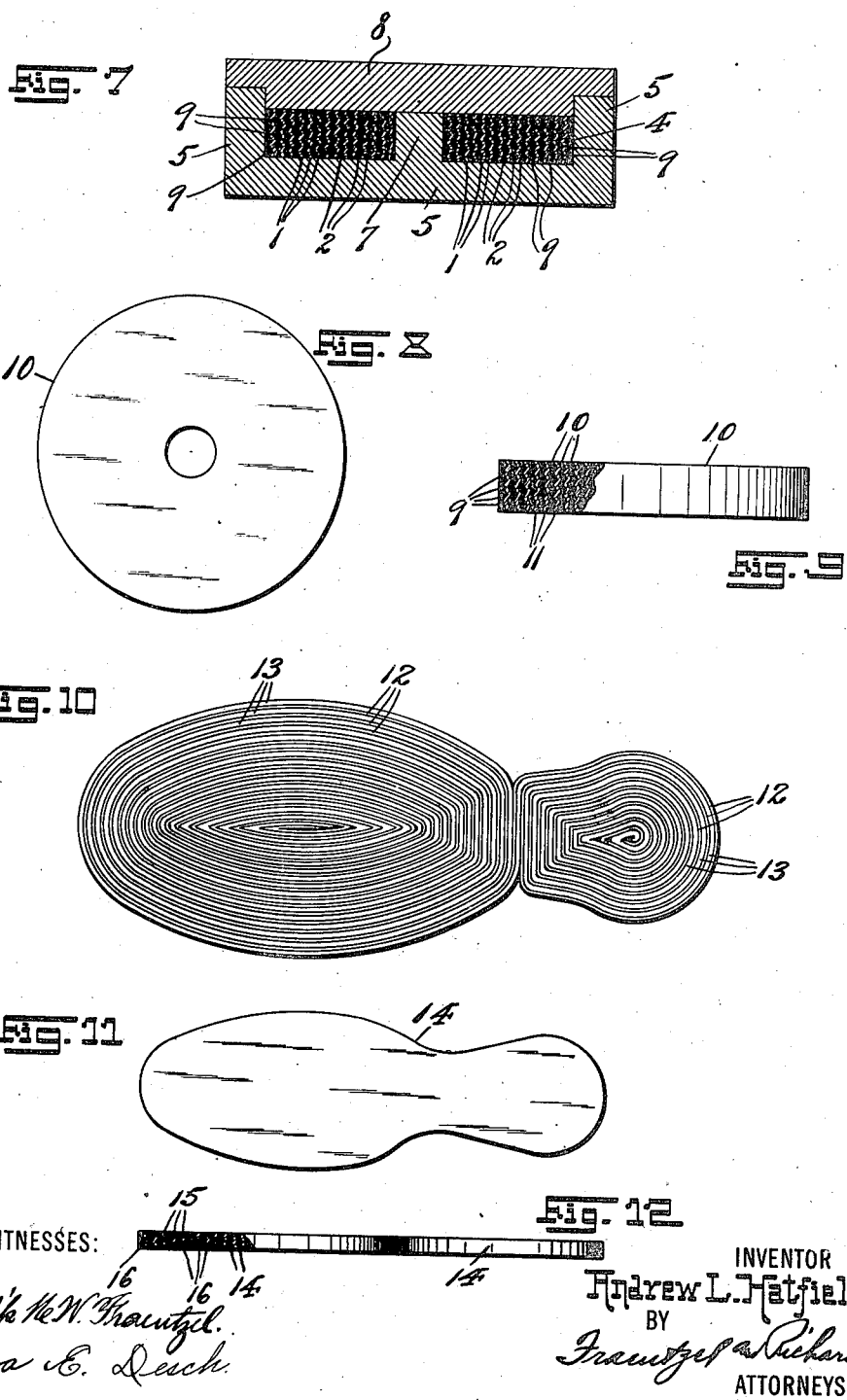

UNITED STATES PATENT OFFICE.

ANDREW L. HATFIELD, OF HILLSIDE, NEW JERSEY.

REINFORCED VULCANIZABLE ARTICLE AND METHOD OF PRODUCING THE SAME.

1,205,345.

Specification of Letters Patent.

Patented Nov. 21, 1916.

Application filed February 5, 1916. Serial No. 76,256.

*To all whom it may concern:*

Be it known that I, ANDREW L. HATFIELD, a citizen of the United States, residing at Hillside, in the county of Union and State of New Jersey, have invented certain new and useful Improvements in Reinforced Vulcanizable Articles and Methods of Producing the Same; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention relates generally to a novel construction of reinforced flat vulcanized articles and method of making the same; and the invention has reference, more particularly, to a novel construction of reinforced vulcanized articles such as pump-valves, valve-disks, packing rings, shoe-soles and similar flat articles, and the invention also refers to a novel method of manufacturing such articles to produce the desired novel form of reinforcement thereof.

The invention has for its principal objects to provide a flat vulcanized article of the kind above mentioned in which is embedded a reinforcing material which has been forced into an interlocking relation both with the material of which the article is made and with its own convolutions or parts, and to provide a novel method of preparing, arranging and distributing the said reinforcing material throughout the article and of forming therein its interlocking construction.

Other objects of the present invention, not at this time more particularly enumerated, will be clearly understood from the following detailed description of this invention.

The invention consists, primarily, therefore, in the novel construction of reinforced flat vulcanized articles hereinafter set forth together with the method of making the same; and the invention consists, furthermore, on the one hand, in the novel arrangements and combinations of the several devices and parts, as well as in the details of the construction of the said parts, and on the other hand, in the novel method steps and combination of steps or acts performed in the manufacture of said articles, all of which will be more fully described in detail in the following specification, and then finally embodied in the claims which are appended to and which form an essential part of said specification.

The invention is clearly illustrated in the accompanying drawings, in which:—

Figure 1 is an edge view of a piece of suitable fabric used as the reinforcing material for the purposes of the present invention; Fig. 2 is an edge view of such fabric coated with a layer of vulcanizable material such as rubber or other similar material; Fig. 3 is a side view of the coated fabric as rolled upon in convolute form; Fig. 4 illustrates the operation of cutting from said rolled-up coated fabric blanks of desired size for introduction into a mold; Fig. 5 is a cross section of a blank prepared for insertion in a vulcanizing mold; Fig. 6 is a vertical cross section which shows said blank inserted in a vulcanizing mold; Fig. 7 is a similar cross section which shows said mold as closed under pressure to form the interlocking relations and characteristics of the reinforcing fabric preparatory to vulcanizing the blank. Fig. 8 is a face view of a finished vulcanized article removed from the mold, the article shown being a pump-valve. Fig. 9 is a part side elevation and part vertical section of said finished article. Fig. 10 is a face view of a blank formed from the coated fabric shaped to produce a shoe-sole, and ready to be inserted in a vulcanizing mold. Fig. 11 is a view of a finished vulcanized article removed from the mold, the article shown thereby being a shoe-sole. Fig. 12 is a part side elevation and part vertical section of said finished shoe-sole.

Similar characters of reference are employed in all of the above described views, to indicate corresponding parts.

Referring now to Figs. 1 to 7 of the said drawings I will describe, by reference thereto, the novel method of producing the novel reinforced flat vulcanized articles.

First I take a sheet of some suitable fabric 1, which is shown edgewise in Fig. 1, and which may be composed of any suitable material having flexibility, such as cotton or other fibrous fabric, canvas, or metallic wire mesh. This fabric 1 may be of any width and length found desirable. I apply to this fabric 1 a coating 2 of some vulcanizable substance, such, for example, as a suitable rubber compound. This coating may be applied by means of calendar rolls or by any other desirable means which will apply the same to the fabric evenly and smoothly. I then roll up the coated fabric, as shown in Fig. 3, either by means of a revolving mandrel 3, or without the latter, or in any other way, so long as a desired cross sectional outline is obtained. As thus rolled up the coated fabric is formed into alternated convolutions of fabric 1 and vulcanizable substance 2. After the coated fabric has thus been rolled up, it is cut into sections to form the blanks 4 for insertion in a suitable vulcanizing mold, by means of a cutting-bed 25 and shear-blades 26, as shown in Fig. 4, or by any other convenient means. The blanks 4 are cut so as to be greater in thickness than the desired thickness of the finished product. This unvulcanized blank 4, as shown in Fig. 5, comprises a flat body of substantially the shape desired to be molded, comprising spirally or concentrically disposed vertical layers of alternated fabric 1 and vulcanizable coating 2. The blanks 4 are now ready to be inserted in a suitable vulcanizing or curing mold 5, the mold shown in Figs. 6 and 7 being designed to shape pump-valves having a central opening, hence said mold 5 comprises a molding or forming chamber 6, in which is a centrally disposed core 7. The reference character 8 indicates any suitable form of mold cover adapted to extend over and close the molding or forming chamber 6.

Since the thickness of the blank 4 is greater than the desired thickness of the finished article, it is greater in thickness than the depth of the mold 5, consequently when the mold cover is put in place it does not close down entirely upon the body of the mold, but rests upon the upper surface of the blank 4, as shown in Fig. 6 of the drawings. In this partially closed condition the mold and its contents is submitted to a considerable pressure, applied either by a hydraulic press or otherwise, and the pressure thus applied closes the mold entirely and crushes down the blank 4 so that the same fills up the mold chamber. Since the convolutions of the reinforcing fabric 1 as disposed in said blank 4 stand vertically, or in other words are disposed edgewise to the direction of pressure, applied as above mentioned, such pressure upon the blank 4 causes a lateral displacement from the vertical or perpendicular of portions of the said fabric 1 in opposite directions, so that the vertical faces of said fabric 1 assume wave-like form, and thereby provide throughout the mass of vulcanizable material 2 a spaced distribution or arrangement of said reinforcing fabric convolutions having interlocking and dovetailing laterally extending binding or locking portions 9 of irregular form and irregular disposition. In addition to thus forming said binding or locking portions 9 in said fabric 1, the pressure, applied as above mentioned, tends to press the vulcanizable material firmly into contact with both surfaces of the reinforcing fabric 1, and even into and through the minute pores or interstices of its weave so that the vulcanizable material 2 is thoroughly compacted around the reinforcing fabric 1, and at the same time forced to fill out the shape of the mold.

After the above operations have been completed the mold and its contents are submitted to any usual and well known vulcanizing step by the application of heat thereto. Thus the contents of the blank 4 is vulcanized or cured whereby it is hardened into the desired shape and the reinforcing fabric 1 with its binding or locking portions 9 firmly embedded therein.

The product of the above novel method comprises a novel structure consisting of a flat body portion of desired shape and thickness and provided throughout the mass of its vulcanized body 10 with vertically parallel reinforcing strips 11 having oppositely and laterally projecting binding or locking portions 9 extending into and interlocking both with the body 10 and relatively one with another.

This novel product may be formed into various shapes of flat articles which may serve various purposes, such as pump-valves, valve-disks, packing rings and strips, etc.

The novel product may be made in the form of shoe-soles as shown in Figs. 10, 11 and 12. In such case the reinforcing fabric 12 coated with the vulcanizable substance 13, such as a rubber compound, is wound up to roughly assume the general shape of the shoe-sole, whereupon it is placed in a proper shape of mold, submitted to pressure to provide the novel distribution and construction of reinforcing and interlocking elements, and then vulcanized. The finished product then consists of a properly shaped shoe-sole, as 14 shown in Fig. 11, and is provided throughout the mass of its vulcanized body 14 with vertically parallel reinforcing strips 15 having oppositely and laterally projecting binding or locking portions 16 extending into and interlocking both with the body 14 and relatively one with another.

The novel articles thus produced provide an exceedingly strong and durable device, which easily resists all tendencies to warp, crack, chip or break, the same being tough and adapted by virtue of its novel means of reinforcement to resist all characters of strains to which it may be subjected in use. One of the most important points of novelty lies in the provision in the vertically parallel reinforcing strips of the laterally and oppositely extending binding or locking portions 9, which serve not only the purpose of strongly binding the mass of vulcanized material or body together but also tend to distribute strain or stress attacks upon any point of the mass or body in different directions, thus eliminating liability of cleavage, separation or cracking, as would be very likely to occur were the reinforcing strips of fabric embedded in strictly or merely smooth vertically parallel relation.

I am aware that some changes may be made both in the various combinations and order of the method steps and in the various combinations and arrangements of the structural parts of the present invention. Hence I do not limit my invention to the exact details above described in connection with either the method or product in which said invention is embodied, except as limited by the scope of the claims appended hereto.

I claim:

1. A method of producing reinforced flat vulcanized articles consisting of coating a suitable reinforcing fabric with a vulcanizable compound, rolling up the coated fabric in convolute form to provide alternated layers of fabric and compound, cutting from the rolled up coated fabric transverse sections thereof to form mold blanks having a thickness greater than the depth of the mold, then placing the blanks in a mold, submitting the blanks to pressure directed edgewise to the layers of reinforcing fabric therein for the purpose of filling up the mold chamber, compacting the compound and producing laterally and oppositely projecting binding portions extending from opposite faces of said fabric into the intervening layers of compound, and then vulcanizing said blanks in the mold to harden the compound and embed therein the reinforcing fabric thus disposed and formed.

2. In articles of the kind described a flat body of hardened material, a reinforcing fabric strip extending through the mass thereof in convolute form to provide fabric layers disposed edgewise to the plane of said flat body alternated with layers of said hardened material, said fabric strip being of wavy form in cross section whereby it interlocks with the hardened material on each side thereof and one fabric layer interlocks relatively with another.

In testimony, that I claim the invention set forth above I have hereunto set my hand this 2nd day of February, 1916.

ANDREW L. HATFIELD.

Witnesses:
FREDK. C. FRAENTZEL,
FRED'K H. W. FRAENTZEL.